US008502513B2

(12) United States Patent
Imura

(10) Patent No.: US 8,502,513 B2
(45) Date of Patent: Aug. 6, 2013

(54) VOLTAGE REGULATOR

(75) Inventor: Takashi Imura, Chiba (JP)

(73) Assignee: Seiko Instruments Inc. (JP)

( * ) Notice: Subject to any disclaimer, the term of this patent is extended or adjusted under 35 U.S.C. 154(b) by 864 days.

(21) Appl. No.: 12/653,535

(22) Filed: Dec. 15, 2009

(65) Prior Publication Data

US 2010/0156373 A1 Jun. 24, 2010

(30) Foreign Application Priority Data

Dec. 24, 2008 (JP) ................................ 2008-327058

(51) Int. Cl.
*G05F 1/40* (2006.01)
*H02H 7/00* (2006.01)

(52) U.S. Cl.
USPC ........................................... 323/282; 361/18

(58) Field of Classification Search
USPC ............ 323/268, 271, 282, 284, 285; 361/18
See application file for complete search history.

(56) References Cited

U.S. PATENT DOCUMENTS 5,966,004 A * 10/1999 Kadanka ...................... 323/271
7,315,154 B2 * 1/2008 Sugiura ......................... 323/276
7,977,929 B2 * 7/2011 Turchi et al. ................. 323/283
7,982,445 B1 * 7/2011 Xin-LeBlanc ................ 323/282
8,385,029 B2 * 2/2013 Wibben .......................... 361/18

FOREIGN PATENT DOCUMENTS

JP 2005115659 4/2005

* cited by examiner

*Primary Examiner* — Matthew Nguyen
(74) *Attorney, Agent, or Firm* — Adams & Wilks

(57) ABSTRACT

A voltage regulator has an output transistor that outputs an output voltage. A first circuit controls a control terminal voltage to increase the output voltage when an undershoot has occurred in the output voltage. A second circuit controls the control terminal voltage to prevent an output current from exceeding an overcurrent when the output current becomes the overcurrent, and disables the first circuit when the output current is prevented from exceeding the overcurrent so that the first circuit does not control the control terminal voltage to increase the output voltage.

20 Claims, 4 Drawing Sheets

VOLTAGE REGULATOR

BACKGROUND OF THE INVENTION

1. Field of the Invention

The present invention relates to a voltage regulator that operates so that an output voltage may be kept constant.

2. Description of the Related Art

A conventional voltage regulator is described. FIG. 4 is a diagram illustrating the conventional voltage regulator.

As an output voltage VOUT increases, a divided voltage VFB of a voltage divider circuit 92 also increases. On this occasion, an amplifier 94 compares the divided voltage VFB with a reference voltage VREF, and accordingly when the divided voltage VFB becomes higher than the reference voltage VREF, a control signal VC also increases. Then, an ON-state resistance of an output transistor 91 increases to decrease the output voltage VOUT. As a result, the output voltage VOUT is kept constant.

On the other hand, as the output voltage VOUT decreases, the divided voltage VFB of the voltage divider circuit 92 also decreases. On this occasion, the amplifier 94 compares the divided voltage VFB with the reference voltage VREF, and accordingly when the divided voltage VFB becomes lower than the reference voltage VREF, the control signal VC also decreases. Then, the ON-state resistance of the output transistor 91 decreases to increase the output voltage VOUT. As a result, the output voltage VOUT is kept constant.

In this voltage regulator, it is assumed that the output voltage VOUT further decreases to be lower than a predetermined voltage value, that is, an undershoot has occurred in the output voltage VOUT. In this case, a current adder circuit 95 controls the amplifier 94 so that an operating current of the amplifier 94 may increase. Then, response characteristics of the amplifier 94 are improved to make rapid improvements to the undershoot, resulting in improved undershoot characteristics of the voltage regulator (see, for example, JP 2005-115659 A).

There may be a case where an output current limiting circuit is provided to serve as a protection function that is capable of limiting an output current so as to decrease the output voltage VOUT when the output current becomes an overcurrent.

In this case, in the conventional technology, even when the output current limiting circuit serving as the protection function has allowed the output voltage VOUT to decrease, an undershoot is determined to have occurred in the output voltage VOUT, and then the current adder circuit 95 causes the output voltage VOUT to increase. Therefore, there arises a problem that a circuit operation of the voltage regulator becomes unstable.

SUMMARY OF THE INVENTION

The present invention has been made in view of the above-mentioned problem, and provides a voltage regulator capable of performing a stable circuit operation while improving undershoot characteristics thereof.

In order to solve the above-mentioned problem, the present invention provides a voltage regulator that operates so that an output voltage is kept constant, the voltage regulator including: an output transistor for outputting the output voltage; an undershoot improvement circuit that operates so that the output voltage increases, when an undershoot has occurred in the output voltage; and an output current limiting circuit for controlling, when an output current becomes an overcurrent, a control terminal voltage of the output transistor so that the output current is prevented from exceeding the overcurrent, and for disabling the undershoot improvement circuit.

According to the present invention, when the output current becomes an overcurrent, the output current limiting circuit disables the undershoot improvement circuit, and hence the undershoot improvement circuit does not cause the output voltage to increase, while the output current limiting circuit serving as a protection function allows the output voltage to decrease. Therefore, in case of overcurrent, the protection function provided for the voltage regulator is enabled, which results in the stable circuit operation of the voltage regulator.

DETAILED DESCRIPTION OF THE PREFERRED EMBODIMENT

Now, referring to the accompanying drawings, an embodiment of the present invention is described.

Figure 1:
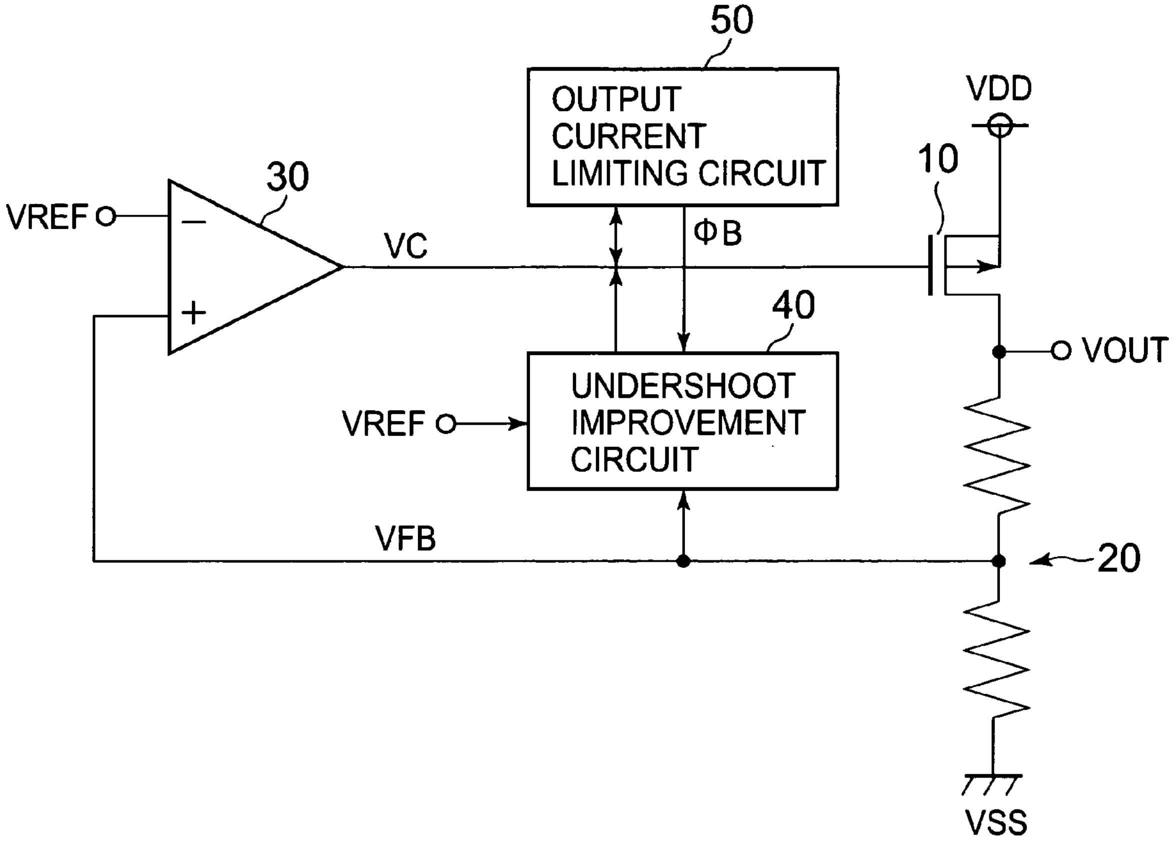
FIG. 1 is a block diagram illustrating a voltage regulator of the present invention.
Figure 2:
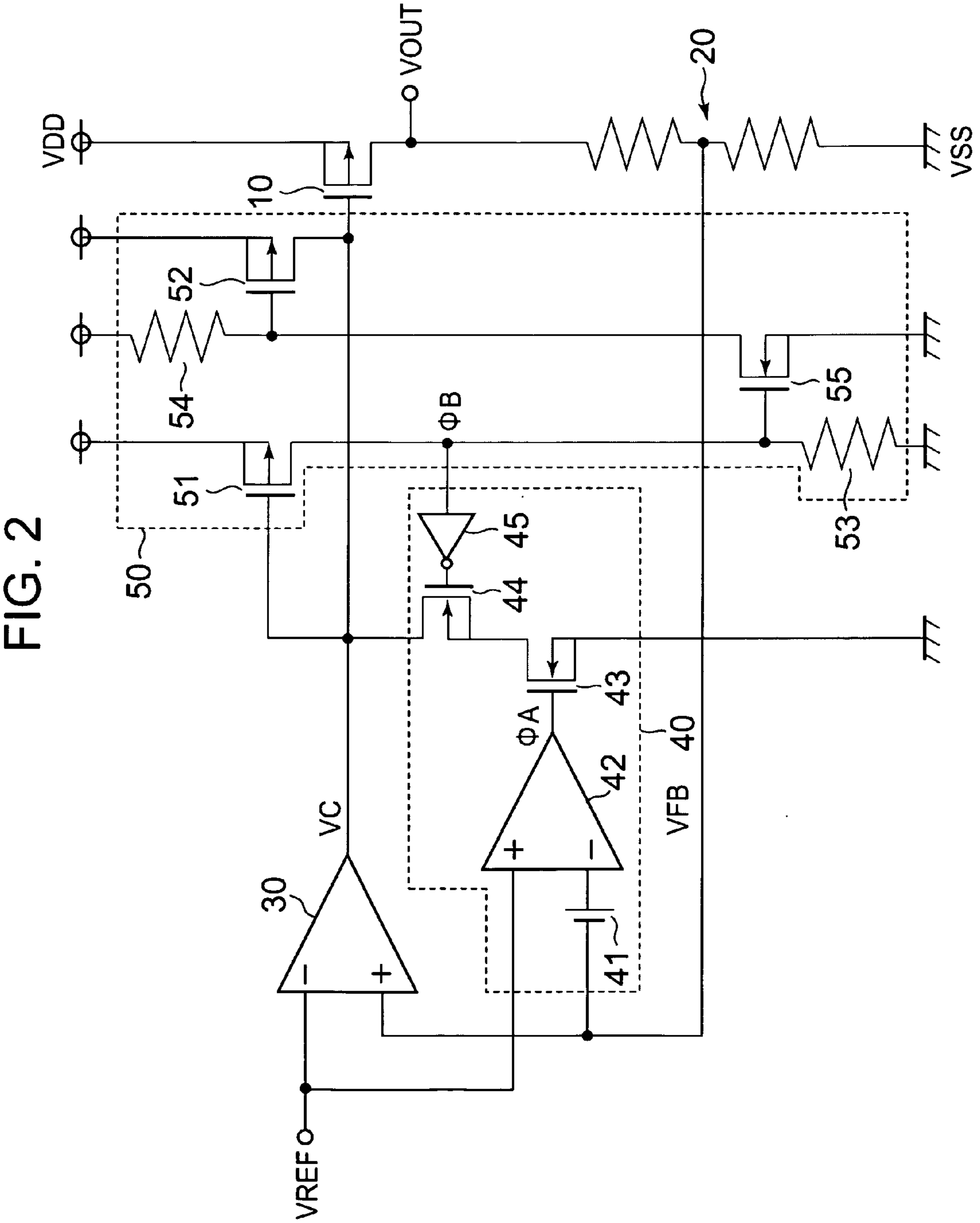
FIG. 2 is a circuit diagram illustrating the voltage regulator of the present invention.

First, a configuration of a voltage regulator is described. FIG. 1 is a block diagram illustrating the voltage regulator of the present invention. FIG. 2 is a circuit diagram illustrating the voltage regulator of the present invention.

The voltage regulator includes an output transistor 10, a voltage divider circuit 20, an amplifier 30, an undershoot improvement circuit (first control circuit) 40, and an output current limiting circuit (second control circuit) 50.

The undershoot improvement circuit 40 includes an offset voltage generation circuit 41, a comparator 42, N-type metal oxide semiconductor (NMOS) transistors 43 and 44, and an inverter 45.

The output current limiting circuit 50 includes P-type metal oxide semiconductor (PMOS) transistors 51 and 52, resistors 53 and 54, and an NMOS transistor 55.

The output transistor 10 has a gate connected to an output terminal of the amplifier 30, a source connected to a power supply terminal, and a drain connected to an output terminal of the voltage regulator. The voltage divider circuit 20 is provided between the output terminal of the voltage regulator and a ground terminal. The amplifier 30 has a non-inverting input terminal connected to an output terminal of the voltage divider circuit 20, and an inverting input terminal connected to a reference voltage terminal. The undershoot improvement circuit 40 controls a control signal VC based on a divided voltage VFB, a reference voltage VREF, and a control signal ΦB. The output current limiting circuit 50 controls the control signal VC and the control signal ΦB based on the control signal VC.

The comparator 42 has a non-inverting input terminal connected to the reference voltage terminal, and an inverting input terminal connected to the output terminal of the voltage divider circuit 20 via the offset voltage generation circuit 41. The NMOS transistor 43 has a gate connected to an output terminal of the comparator 42, a source connected to the ground terminal, and a drain connected to a source of the NMOS transistor 44. The NMOS transistor 44 has a gate connected to an output terminal of the inverter 45, and a drain connected to the gate of the output transistor 10. The inverter 45 has an input terminal connected to a connection point between a drain of the PMOS transistor 51 and the resistor 53.

The PMOS transistor 51 has a gate connected to the gate of the output transistor 10, and a source connected to the power supply terminal. The resistor 53 is provided between the drain of the PMOS transistor 51 and the ground terminal. The NMOS transistor 55 has a gate connected to another connection point between the drain of the PMOS transistor 51 and the resistor 53. The NMOS transistor 55 has a source connected to the ground terminal. The resistor 54 is provided between the power supply terminal and a drain of the NMOS transistor 55. The PMOS transistor 52 has a gate connected to a connection point between the resistor 54 and the drain of the NMOS transistor 55. The PMOS transistor 52 has a source connected to the power supply terminal, and a drain connected to the gate of the output transistor 10.

The output transistor 10 outputs an output voltage VOUT. The voltage divider circuit 20 divides the output voltage VOUT to output the divided voltage VFB. The amplifier 30 compares the divided voltage VFB with the reference voltage VREF. Subsequently, when the divided voltage VFB becomes higher than the reference voltage VREF, the amplifier 30 controls the control signal VC so that an ON-state resistance of the output transistor 10 may increase to decrease the output voltage VOUT. On the other hand, when the divided voltage VFB becomes lower than the reference voltage VREF, the amplifier 30 controls the control signal VC so that the ON-state resistance of the output transistor 10 may decrease to increase the output voltage VOUT. When an undershoot has occurred in the output voltage VOUT, the undershoot improvement circuit 40 controls the control signal VC so that the output voltage VOUT may increase. When an output current IOUT becomes an overcurrent IL, the output current limiting circuit 50 controls the control signal VC so that the output current TOUT may be prevented from exceeding the overcurrent IL, and the output current limiting circuit 50 disables the undershoot improvement circuit 40.

In the undershoot improvement circuit 40, the offset voltage generation circuit 41 generates an offset voltage VO. The comparator 42 compares a voltage determined by adding the offset voltage VO to the divided voltage VFB, with the reference voltage VREF. Subsequently, when the comparator 42 determines that an undershoot has occurred in the output voltage VOUT, the comparator 42 controls a control signal ΦA so that the NMOS transistor 43 serving as a control transistor may be turned ON, to thereby control the control signal VC so that the ON-state resistance of the output transistor 10 may decrease to increase the output voltage VOUT. The control transistor 43 controls the control signal VC. When the output current IOUT becomes the overcurrent IL, the NMOS transistor 44 and the inverter 45 disable the undershoot improvement circuit 40.

In the output current limiting circuit 50, the PMOS transistor 51 allows a sense current to flow therethrough based on the output current IOUT. As the sense current becomes larger, a voltage generated across the resistor 53 increases, and accordingly a voltage generated across the resistor 54 increases. When the voltage generated across the resistor 53 reaches a predetermined voltage value (i.e. when the control signal ΦB becomes high level), the output current limiting circuit 50 disables the undershoot improvement circuit 40. In addition, when the voltage generated across the resistor 54 reaches a predetermined voltage value, the output current limiting circuit 50 controls the control signal VC so that the output current IOUT may be prevented from exceeding the overcurrent IL.

Figure 3:
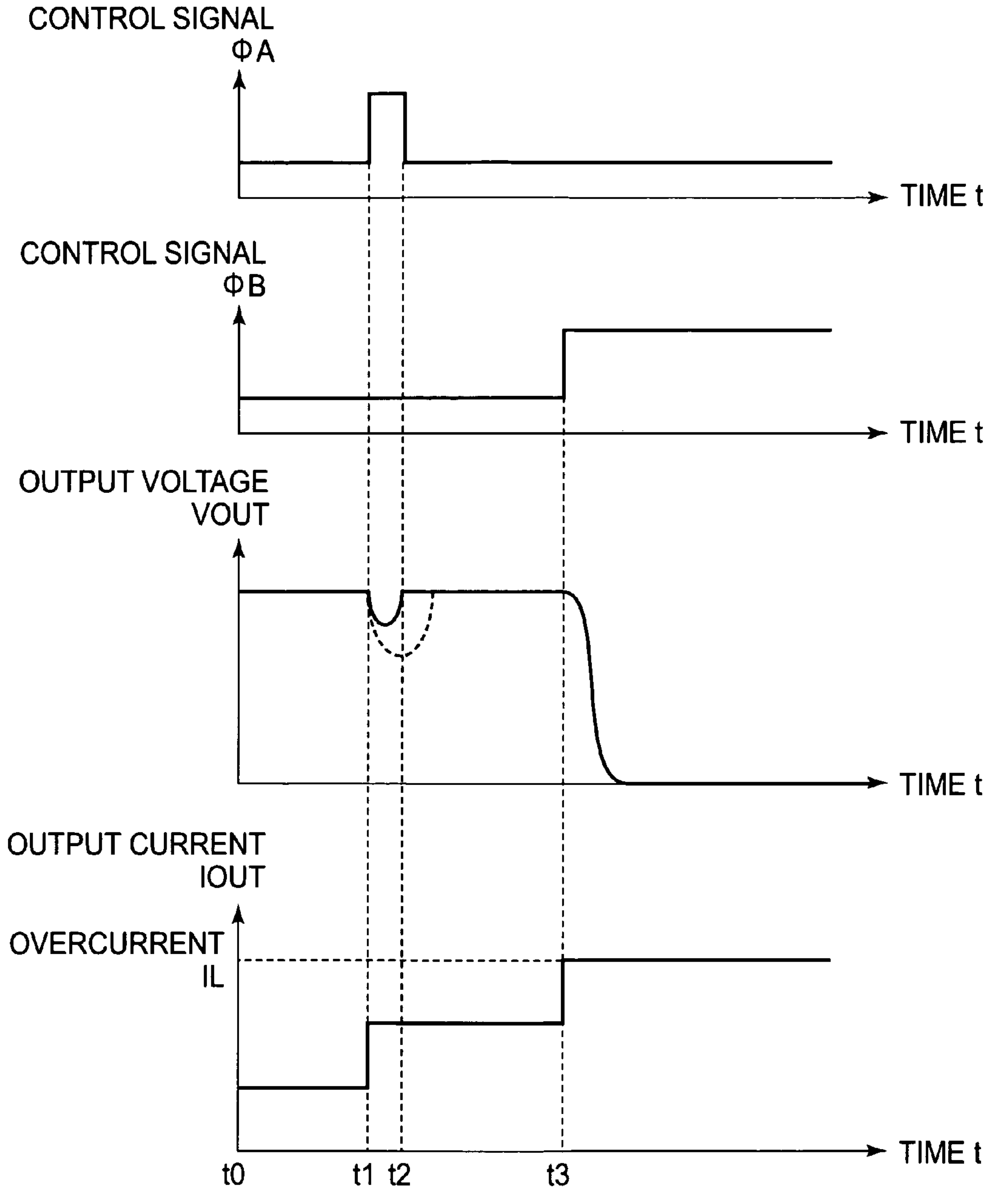
FIG. 3 is a time chart illustrating an output voltage and an output current of the voltage regulator of the present invention.
Figure 4:
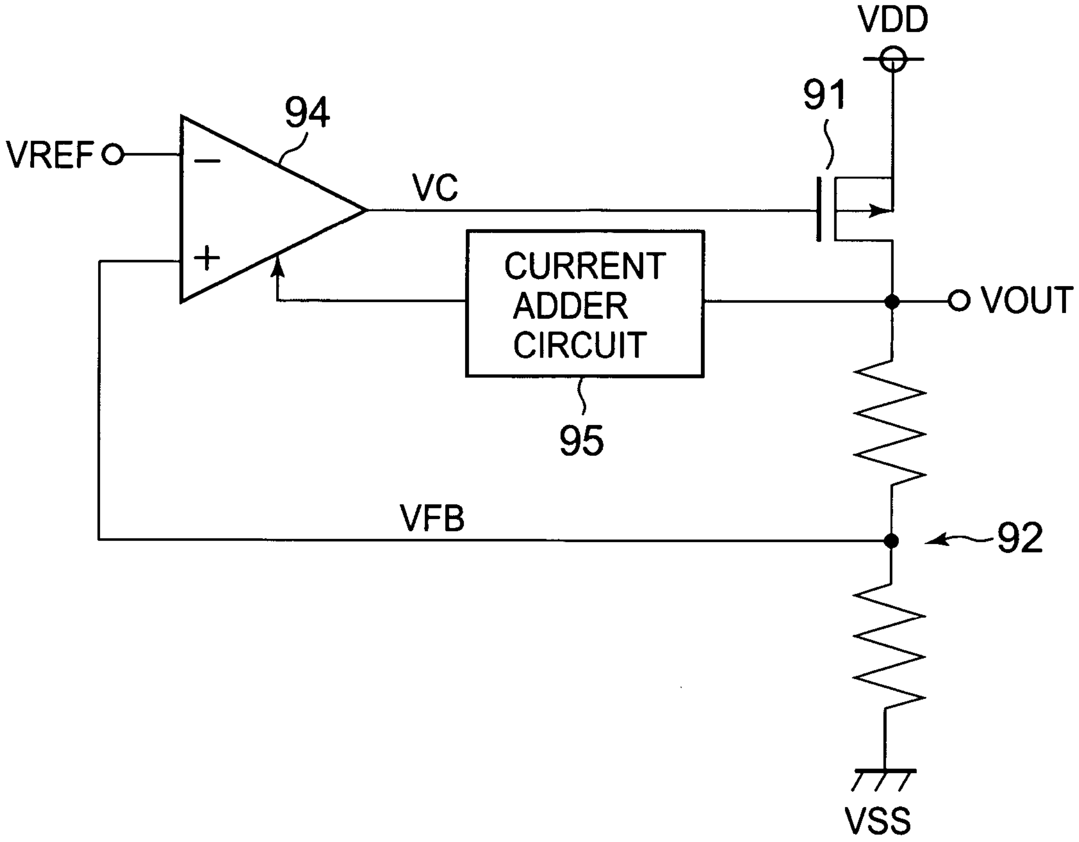
FIG. 4 PRIOR ART
FIG. 4 is a block diagram illustrating a conventional voltage regulator.

Next, an operation of the voltage regulator is described. FIG. 3 is a time chart illustrating an output voltage and an output current.

During a normal operation (t0≦t1), as the output voltage VOUT increases, the divided voltage VFB also increases. The amplifier 30 compares the divided voltage VFB with the reference voltage VREF, and accordingly when the divided voltage VFB becomes higher than the reference voltage VREF, the control signal VC also increases. Then, the ON-state resistance of the output transistor 10 increases to decrease the output voltage VOUT. As a result, the output voltage VOUT is kept constant.

On the other hand, as the output voltage VOUT decreases, the divided voltage VFB also decreases. On this occasion, the amplifier 30 compares the divided voltage VFB with the reference voltage VREF, and accordingly when the divided voltage VFB becomes lower than the reference voltage VREF, the control signal VC also decreases. Then, the ON-state resistance of the output transistor 10 decreases to increase the output voltage VOUT. As a result, the output voltage VOUT is kept constant.

While an undershoot is occurring in the output voltage VOUT (t1≦t≦t2), as the output voltage VOUT decreases, the divided voltage VFB also decreases. The comparator 42 compares the voltage determined by adding the offset voltage VO to the divided voltage VFB, with the reference voltage VREF, and accordingly when the voltage determined by adding the offset voltage VO to the divided voltage VFB becomes lower than the reference voltage VREF, the control signal ΦA becomes high level. Then, the NMOS transistor 43 is turned ON. In addition, as described later, the NMOS transistor 44 is also turned ON because the output current IOUT is smaller than the overcurrent IL. Then, the control signal VC decreases, and accordingly the ON-state resistance of the output transistor 10 decreases to increase the output voltage VOUT. As a result, rapid improvements are made to the undershoot, resulting in improved undershoot characteristics of the voltage regulator. At this time, in the time chart of FIG. 3 illustrating the output voltage VOUT, owing to the undershoot improvement circuit 40, the output voltage VOUT has a waveform indicated by the solid line. However, if the undershoot improvement circuit 40 is not provided, the output voltage VOUT would have a waveform indicated by the dotted line, and it takes a longer time for the output voltage VOUT to increase to reach a predetermined voltage value until the undershoot has occurred in the output voltage VOUT.

The case is described where the output current IOUT becomes the overcurrent IL (t≧t3). The case where the output current IOUT becomes the overcurrent IL occurs when a load connected to the output terminal of the voltage regulator becomes rapidly heavy. Because the PMOS transistor 51 allows a sense current to flow therethrough based on the output current IOUT of the output transistor 10, the sense current becomes larger to increase the voltage generated across the resistor 53. When the voltage generated across the resistor 53 becomes higher than a threshold voltage of the NMOS transistor 55, the NMOS transistor 55 is turned ON. Then, the NMOS transistor 55 allows a current to flow therethrough, and accordingly the voltage generated across the resistor 54 increases. When the voltage generated across the resistor 54 becomes higher than an absolute value of a threshold voltage of the PMOS transistor 52, the PMOS transistor 52 is turned ON. Then, the control signal VC increases, and accordingly the ON-state resistance of the output transistor 10 increases to decrease the output voltage VOUT. At this time, the output voltage VOUT decreases to, for example, 0 V. Therefore, in case of overcurrent, the voltage regulator is protected.

In this case, when the voltage generated across the resistor 53 (control signal ΦB) becomes higher than an inverting threshold voltage of the inverter 45, the control signal ΦB becomes high level with respect to the inverter 45, and accordingly an output voltage of the inverter 45 becomes low level. Then, the NMOS transistor 44 is turned OFF, which disables the undershoot improvement circuit 40 from controlling the control signal VC. Therefore, in case of overcurrent, the undershoot improvement circuit 40 is disabled.

With this configuration, when the output current IOUT becomes the overcurrent IL, the output current limiting circuit 50 disables the undershoot improvement circuit 40, and hence the undershoot improvement circuit 40 does not cause the output voltage VOUT to increase, while the output current limiting circuit 50 serving as the protection function allows the output voltage VOUT to decrease. Therefore, in case of overcurrent, the protection function provided for the voltage regulator is enabled, which results in a stable circuit operation of the voltage regulator.

It is noted that when an undershoot has occurred in the output voltage VOUT, in order to rapidly increase the output voltage VOUT, the undershoot improvement circuit 40 decreases the control signal VC. Alternatively, though not illustrated, the undershoot improvement circuit 40 may increase a drive current of a current source for the amplifier 30.

Further, the undershoot improvement circuit 40 monitors the divided voltage VFB. Alternatively, though not illustrated, the undershoot improvement circuit 40 may monitor the output voltage VOUT. In this case, adapting to the replacement of the divided voltage VFB with the output voltage VOUT, the reference voltage is appropriately set.

Further, the undershoot improvement circuit 40 monitors the output voltage (divided voltage VFB) of the voltage divider circuit 20 having a certain voltage division ratio. Alternatively, though not illustrated, another voltage divider circuit having another voltage division ratio may be newly added, and the undershoot improvement circuit 40 may monitor an output voltage of the newly-added voltage divider circuit. In this case, adapting to the replacement of the output voltage of the voltage divider circuit 20 with the output voltage of the newly-added voltage divider circuit, the reference voltage is appropriately set.

Further, the amplifier 30 and the undershoot improvement circuit 40 are connected to the same reference voltage terminal. Alternatively, though not illustrated, the amplifier 30 and the undershoot improvement circuit 40 may be connected to different reference voltage terminals.

What is claimed is:

1. A voltage regulator that operates so that an output voltage is kept constant, the voltage regulator comprising:
- an output transistor for outputting the output voltage;
- an undershoot improvement circuit that operates so that the output voltage increases, when an undershoot has occurred in the output voltage; and
- an output current limiting circuit for controlling, when an output current becomes an overcurrent, a control terminal voltage of the output transistor so that the output current is prevented from exceeding the overcurrent, and for disabling the undershoot improvement circuit.

2. A voltage regulator according to claim 1, wherein the undershoot improvement circuit controls, when the undershoot has occurred in the output voltage, the control terminal voltage so that the output voltage increases.

3. A voltage regulator according to claim 1, further comprising:
- a voltage divider circuit for dividing the output voltage to output a divided voltage; and
- an amplifier that is configured to:
  - compare the divided voltage with a reference voltage;
  - control, when the divided voltage becomes higher than the reference voltage, the control terminal voltage so that an ON-state resistance of the output transistor increases to decrease the output voltage; and
  - control, when the divided voltage becomes lower than the reference voltage, the control terminal voltage so that the ON-state resistance of the output transistor decreases to increase the output voltage.

4. A voltage regulator according to claim 3, wherein the undershoot improvement circuit controls, when the undershoot has occurred in the output voltage, a drive current of a current source for the amplifier so that the output voltage increases.

5. A voltage regulator according to claim 3, wherein the undershoot improvement circuit comprises:
- a control transistor for controlling the control terminal voltage;
- a comparator that is configured to:
  - compare a voltage determined based on the divided voltage with the reference voltage; and
  - control the control transistor to be turned ON when determining that the undershoot has occurred in the output voltage, to thereby control the control terminal voltage so that the ON-state resistance of the output transistor decreases to increase the output voltage; and
- a switch for disabling the undershoot improvement circuit when the output current becomes the overcurrent.

6. A voltage regulator according to claim 5, wherein the undershoot improvement circuit further comprises an offset voltage generation circuit for generating an offset voltage, the offset voltage generation circuit being connected to an input terminal of the comparator.

7. A voltage regulator according to claim 1, wherein the output current limiting circuit comprises:
- a sense transistor for allowing a sense current to flow therethrough based on the output current;
- a first resistor across which a first voltage is generated, the first voltage increasing as the sense current becomes larger; and
- a second resistor across which a second voltage is generated, the second voltage increasing as the first voltage becomes higher, and
- wherein the output current limiting circuit is configured to:
  - disable the undershoot improvement circuit based on the first voltage; and
  - control, based on the second voltage, the control terminal voltage so that the output current is prevented from exceeding the overcurrent.

8. A voltage regulator comprising:
- an output transistor that outputs an output voltage;
- a first circuit that controls a control terminal voltage to increase the output voltage when an undershoot has occurred in the output voltage; and
- a second circuit that controls the control terminal voltage to prevent an output current from exceeding an overcurrent when the output current becomes the overcurrent, and that disables the first circuit when the output current is prevented from exceeding the overcurrent so that the first circuit does not control the control terminal voltage to increase the output voltage.

9. A voltage regulator according to claim 8; further comprising: a voltage divider circuit for dividing the output voltage to output a divided voltage; and an amplifier that is configured to compare the divided voltage with a reference voltage, to control the control terminal voltage so that an ON-state resistance of the output transistor increases to decrease the output voltage when the divided voltage becomes higher than the reference voltage, and to control the control terminal voltage so that the ON-state resistance of the output transistor decreases to increase the output voltage when the divided voltage becomes lower than the reference voltage.

10. A voltage regulator according to claim 9; wherein the first circuit controls a drive current of a current source for the amplifier so that the output voltage increases when the undershoot has occurred in the output voltage.

11. A voltage regulator according to claim 9; wherein the first circuit comprises: a control transistor for controlling the control terminal voltage; a comparator that is configured to compare a voltage determined based on the comparison of the divided voltage with the reference voltage and to control the control transistor to be turned ON when determining, that the undershoot has occurred in the output voltage, to thereby control the control terminal voltage so that the ON-state resistance of the output transistor decreases to increase the output voltage; and a switch for disabling the first circuit when the output current becomes the overcurrent.

12. A voltage regulator according to claim 11; wherein the first circuit further comprises an offset voltage generation circuit that generates an offset voltage, the offset voltage generation circuit being connected to an input terminal of the comparator.

13. A voltage regulator according to claim 8; wherein the second circuit comprises: a sense transistor for allowing a sense current to flow therethrough based on the output current; a first resistor across which a first voltage is generated, the first voltage increasing as the sense current becomes larger; and a second resistor across which a second voltage is generated, the second voltage increasing as the first voltage becomes higher; wherein the second circuit is configured to disable the first circuit based on the first voltage and to control, based on the second voltage, the control terminal voltage so that the output current is prevented from exceeding the overcurrent.

14. A voltage regulator for maintaining an output voltage constant, the voltage regulator comprising:

first control means for controlling a control terminal voltage to increase the output voltage when an undershoot has occurred in the output voltage; and second control means for controlling the control terminal voltage to prevent an output current from exceeding an overcurrent when the output current becomes the overcurrent, and for disabling the first control means when the output current is prevented from exceeding the overcurrent so that the first control means does not control the control terminal voltage to increase the output voltage.

15. A voltage regulator according to claim 14;

further comprising: a voltage divider circuit for dividing the output voltage to output a divided voltage; and an amplifier that is configured to compare the divided voltage with a reference voltage, to control the control terminal voltage so that an ON-state resistance of the output transistor increases to decrease the output voltage when the divided voltage becomes higher than the reference voltage, and to control the control terminal voltage so that the ON-state resistance of the output transistor decreases to increase the output voltage when the divided voltage becomes lower than the reference voltage.

16. A voltage regulator according to claim 15; wherein the first control means controls a drive current of a current source for the amplifier so that the output voltage increases when the undershoot has occurred in the output voltage.

17. A voltage regulator according to claim 15; wherein the first control means comprises: a control transistor for controlling the control terminal voltage; a comparator configured to compare a voltage determined based on the comparison of the divided voltage with the reference voltage and to control the control transistor to be turned ON when determining that the undershoot has occurred in the output voltage, to thereby control the control terminal voltage so that the ON-state resistance of the output transistor decreases to increase the output voltage; and a switch for disabling the first control means when the output current becomes the overcurrent.

18. A voltage regulator according to claim 17; wherein the first control means further comprises an offset voltage generation circuit for generating an offset voltage, the offset voltage generation circuit being connected to an input terminal of the comparator.

19. A voltage regulator according to claim 14; wherein the second control means comprises: a sense transistor for allowing a sense current to flow therethrough based on the output current; a first resistor across which a first voltage is generated, the first voltage increasing as the sense current becomes larger; and a second resistor across which a second voltage is generated, the second voltage increasing as the first voltage becomes higher; wherein the second control means disables the first control means based on the first voltage and controls, based on the second voltage, the control terminal voltage so that the output current is prevented from exceeding the overcurrent.

20. A voltage regulator according to claim 14; wherein the first control means comprises: a control transistor for controlling the control terminal voltage; and a comparator that controls the control transistor to be turned ON when the undershoot has occurred in the output voltage to thereby control the control terminal voltage so that the ON-state resistance of the output transistor decreases to increase the output voltage; and a switch for disabling the first control means when the output current becomes the overcurrent.

* * * * *